United States Patent
Carter et al.

(10) Patent No.: US 7,464,115 B2
(45) Date of Patent: Dec. 9, 2008

(54) NODE SYNCHRONIZATION FOR MULTI-PROCESSOR COMPUTER SYSTEMS

(75) Inventors: John Carter, Salt Lake City, UT (US); Randal S. Passint, Chippewa Falls, WI (US); Donglai Dai, Eau Claire, WI (US); Zhen Fang, Salt Lake City, UT (US); Lixin Zhang, Austin, TX (US); Gregory M. Thorson, Altoona, WI (US)

(73) Assignee: Silicon Graphics, Inc., Sunnyvale, CA (US)

( * ) Notice: Subject to any disclaimer, the term of this patent is extended or adjusted under 35 U.S.C. 154(b) by 308 days.

(21) Appl. No.: 11/113,805

(22) Filed: Apr. 25, 2005

(65) Prior Publication Data
US 2006/0242308 A1    Oct. 26, 2006

(51) Int. Cl.
*G06F 13/42* (2006.01)
(52) U.S. Cl. ............... 707/201; 711/147; 711/154; 711/141; 365/189.08

(58) Field of Classification Search ............... None
See application file for complete search history.

(56) References Cited

U.S. PATENT DOCUMENTS

| | | | | |
|---|---|---|---|---|
| 5,897,657 A | * | 4/1999 | Hagersten et al. | 711/145 |
| 5,958,019 A | * | 9/1999 | Hagersten et al. | 713/375 |
| 6,024,477 A | * | 2/2000 | Bauer et al. | 700/3 |
| 6,330,604 B1 | * | 12/2001 | Higuchi et al. | 709/226 |
| 6,785,888 B1 | * | 8/2004 | McKenney et al. | 718/104 |
| 2002/0078305 A1 | * | 6/2002 | Khare et al. | 711/144 |
| 2006/0002309 A1 | * | 1/2006 | Ban | 370/254 |

OTHER PUBLICATIONS

Zhang et al., *Highly Efficient Synchronization Based on Active Memory Operations*, Apr. 26, 2004, pp. 1-10.

\* cited by examiner

*Primary Examiner*—B. James Peikari
(74) *Attorney, Agent, or Firm*—Bromberg & Sunstein LLP

(57) ABSTRACT

A method and apparatus for controlling access by a set of accessing nodes to memory of a home node (in a multimode computer system) determines that each node in the set of nodes has accessed the memory, and forwards a completion message to each node in the set of nodes after it is determined that each node has accessed the memory. The completion message has data indicating that each node in the set of nodes has accessed the memory of the home node.

27 Claims, 4 Drawing Sheets

NODE SYNCHRONIZATION FOR MULTI-PROCESSOR COMPUTER SYSTEMS

FIELD OF THE INVENTION

The invention generally relates to multi-processor computer systems and, more particularly, the invention relates to distributed shared-memory computer systems.

BACKGROUND OF THE INVENTION

Large-scale shared memory multi-processor computer systems typically have a large number of processing nodes (e.g., with one or more microprocessors and local memory) that cooperate to perform a common task. Such systems often use some type of synchronization construct (e.g., barrier variables or spin locks) to ensure that all executing threads maintain certain program invariants. For example, such computer systems may have some number of nodes that cooperate to multiply a large matrix. To do this in a rapid and efficient manner, such computer systems typically divide the task into discrete parts that each are executed by one of the nodes. All of the nodes are synchronized (e.g., when using barrier variables), however, so that they concurrently execute their corresponding steps of the task. Accordingly, such computer systems do not permit any of the nodes to begin executing a subsequent step until all of the other nodes have completed their prior corresponding step.

To maintain synchronization among nodes, many such computer systems often use a specialized variable known in the art as a "synchronization variable." Specifically, each time a node accesses the memory of some other node (referred to as the "home node") or its own memory (the accessing node thus also is the home node in such case), the home node synchronization variable changes in a predetermined manner (e.g., the synchronization variable may be incremented). Some time thereafter, the home node transmits the changed synchronization variable to requesting system nodes (either automatically or in response to requests from the remote nodes). This transmission may be in response to a request by the remote nodes. Upon receipt, each remote node determines if the incremented synchronization variable satisfies some test condition (e.g., they determine if the synchronization variable equals a predetermined test variable). If satisfied, then all remote nodes can continue to the next step of the task. Conversely, if not satisfied, then the remote nodes must wait until they subsequently receive a changed synchronization variable that satisfies the test condition. To receive the changed synchronization variable, however, the remote nodes continue to poll the home node.

Undesirably, these repeated multidirectional transmissions and corresponding coherence operations can create a network hotspot at the home node because, among other reasons, the request rate typically is much higher than its service rate. Compounding this problem, the total number of repeated transmissions and remote node requests increases as the number of nodes in large-scale shared memory multi-processor computer systems increases. Such repeated transmissions/requests thus can congest data transmission paths, consequently degrading system performance.

SUMMARY OF THE INVENTION

In accordance with one aspect of the invention, a method and apparatus for controlling access by a set of accessing nodes to memory of a home node (in a multinode computer system) determines that each node in the set of nodes has accessed the memory, and forwards a completion message to each node in the set of nodes after it is determined that each node has accessed the memory. The completion message has data indicating that each node in the set of nodes has accessed the memory of the home node.

In illustrative embodiments, the method and apparatus determine node access by setting a synchronization variable to an initial value, and updating the synchronization variable each time one of the set of nodes accesses the memory of the home node. After updating the synchronization variable, the method and apparatus determine if it satisfies a relationship with a test variable. The method and apparatus may determine that the relationship is satisfied before forwarding the completion message. The synchronization variable may be considered to satisfy the relationship when both variables have equal values.

Among other things, the completion message may be broadcasted to each accessing node in the set. In addition, each accessing node in the set of nodes illustratively is synchronized to execute a set of steps of a common process. Each accessing node does not execute a subsequent step in the common process, however, until receipt of the completion message. The method and apparatus also may detect that each node in the set of accessing nodes is to access the memory of the home node.

In accordance with another aspect of the invention, an apparatus for controlling access by a set of accessing nodes to memory of a home node has control logic (operatively coupled with the memory of the home node) for determining if each node in the set of nodes has accessed the memory, and a message generator for generating a completion message having data indicating that each node in the set of nodes has accessed the memory of the home node. The apparatus also has an interface (operatively coupled with the message generator) for forwarding the completion message to each node in the set of nodes after it is determined that each node has accessed the memory.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

In illustrative embodiments, a multi-node computer system has a memory controller that broadcasts a single completion message after all remote nodes have accessed home node memory. Upon receipt of the completion message, the remote nodes may proceed to the next step in a jointly executed task/process. This technique thus eliminates the need for the remote nodes to repeatedly poll the home node while it is servicing the access requests. Accordingly, such a process should minimize data traffic congestion, consequently improving system performance. Details of various embodiments are discussed below.

Figure 1:
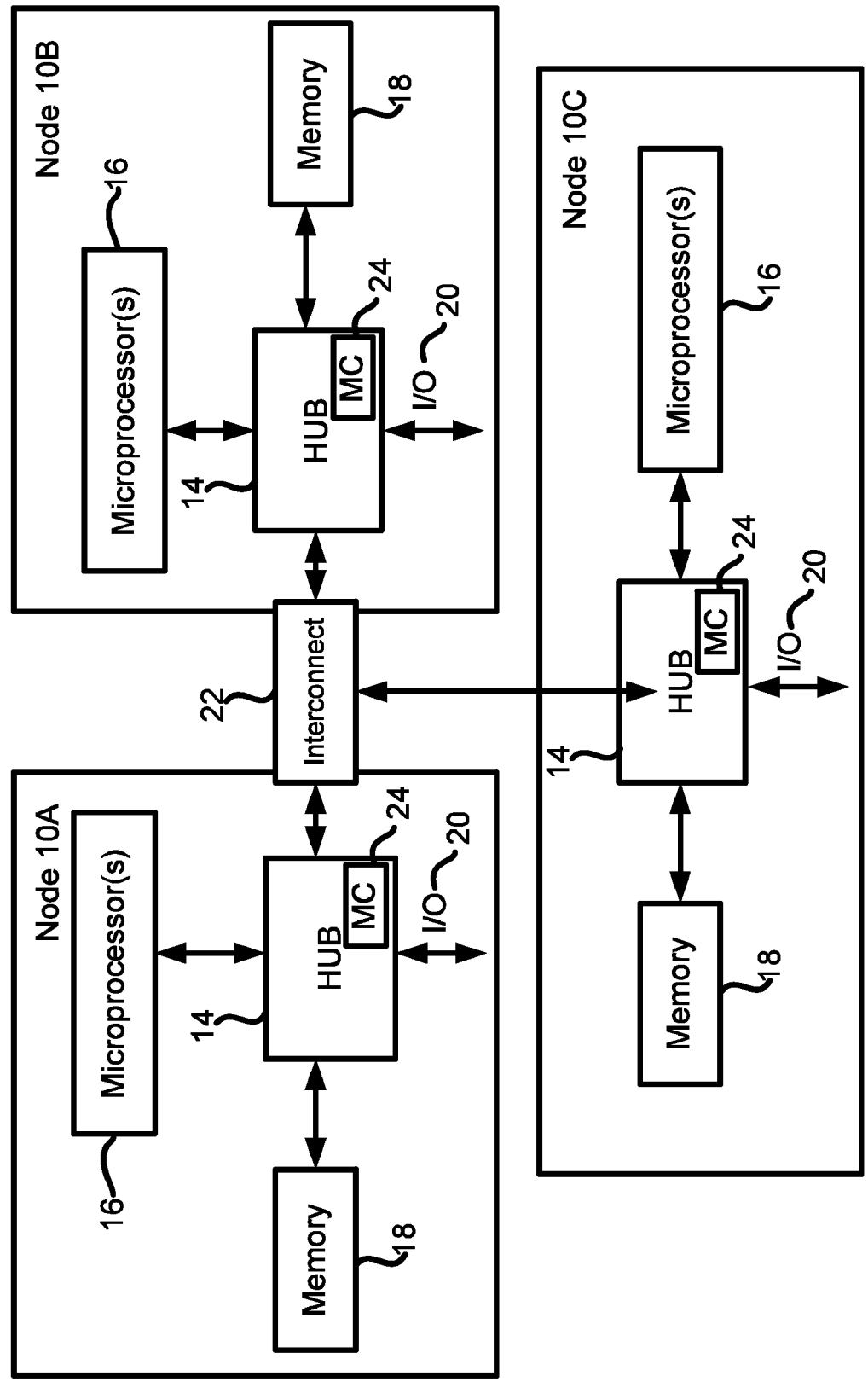
FIG. 1 schematically shows nodes of a multi-processor/multi-node computer system that can be configured in accordance with illustrative embodiments of the invention.

FIG. 1 schematically shows three nodes 10A-10C of a multi-processor/multi-node computer system 12 that can be configured in accordance with illustrative embodiments of the invention. The nodes 10A-10C respectively are identified as node 10A, node B, and node 10C and illustratively have the same general components. Specifically, each node 10A-10C has a plurality of components coordinated by a HUB chip 14. In illustrative embodiments, the HUB chip 14 is a gate array chip customized to perform a number of functions, including those discussed below with regard to FIGS. 3 and 4. The HUB chip 14 also may include a microprocessor instead of, or in addition to, the gate arrays.

The components coupled with the HUB chip 14 include one or more microprocessors 16 for generating data words (among other things), memory 18 for storing data, and an I/O interface 20 for communicating with devices that are external to the computer system 12. In addition, the components also include a interconnect 22 to other nodes in the computer system 12. In illustrative embodiments, the HUB implements a memory controller 24 that efficiently synchronizes remote node access to the home node memory 18. Details are discussed below.

In one exemplary system 12, the microprocessors 16 include two 4X-ITANIUM microprocessors (distributed by Intel Corporation of Santa Clara, Calif.) that generate 128 bit words for storage in a plurality of dual in-line memory modules (shown schematically as memory 18 in FIG. 1). Each DIMM illustratively has eighteen X4-type random access memory chips (e.g., DRAM chips) for storing data generated by the microprocessors 16, and is connected to one of four 72 bit buses (not shown). Accordingly, the HUB chip 14 may transfer 72 bits of data across each bus per clock cycle. The buses illustratively operate independently and transmit data in a synchronized manner.

The microprocessors 16 on the three nodes 10A-10C cooperate to perform a common task. For example, at least one of the microprocessors 16 on each of the nodes 10A-10C may share responsibilities with those on other nodes 10A-10C for multiplying a complex matrix. To that end, certain data to be processed may be located on one of the nodes 10A-10C and thus, must be accessed by the other two nodes 10A-10C to complete their operation. Continuing with the above example, node 10A may have data that nodes 10B, 10C must retrieve and process. In this case, node 10A is considered to be the "home node 10A," while nodes 10B, 10C are considered to be the "remote nodes 10B, 10C." It should be noted, however, that discussion of these three specific nodes 10A-10C is exemplary and thus, not intended to limit all aspects of the invention. Accordingly, this discussion applies to multi-node computer systems 12 having more nodes (e.g., hundreds of nodes) or fewer nodes.

Figure 2:
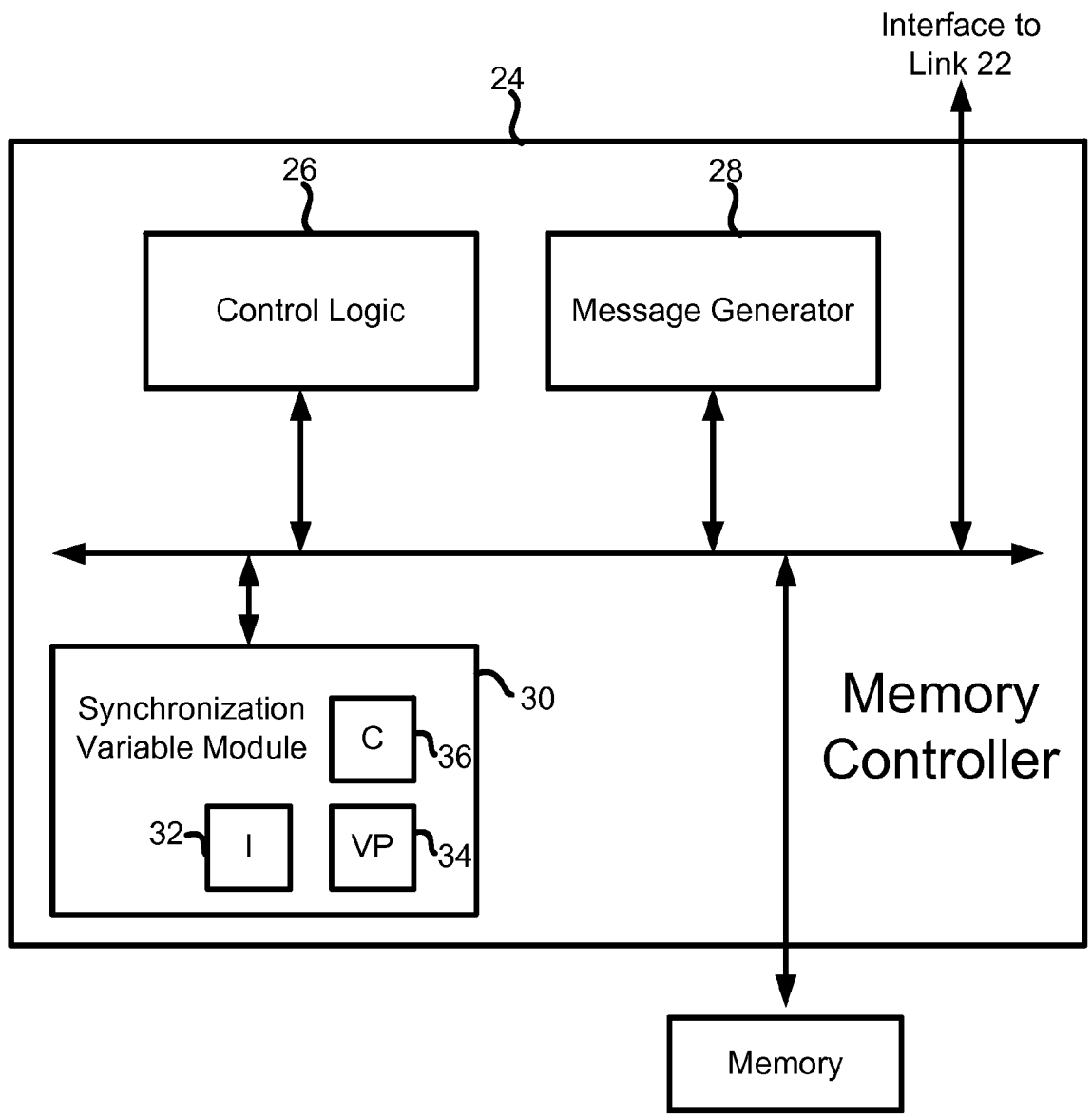
FIG. 2 schematically shows a memory controller configured in accordance with illustrative embodiments of the invention.

FIG. 2 shows a memory controller 24 configured to control home node memory access in a manner that minimizes data traffic congestion within the computer system 12. As noted above, each node may have a memory controller 24. Among other things, the memory controller 24 has control logic 26 for tracking memory access by the remote nodes 10B, 10C, a message generator 28 for producing and managing messages forwarded within the computer system 12, and a synchronization variable module 30 for controlling synchronization variables. Various embodiments may implement barrier variables, spin locks, and other types of synchronization constructs or variables. For simplicity, barrier variables are discussed below as an exemplary implementation. Those in the art should understand, however, that other types of synchronization constructs may be used.

Figure 3:
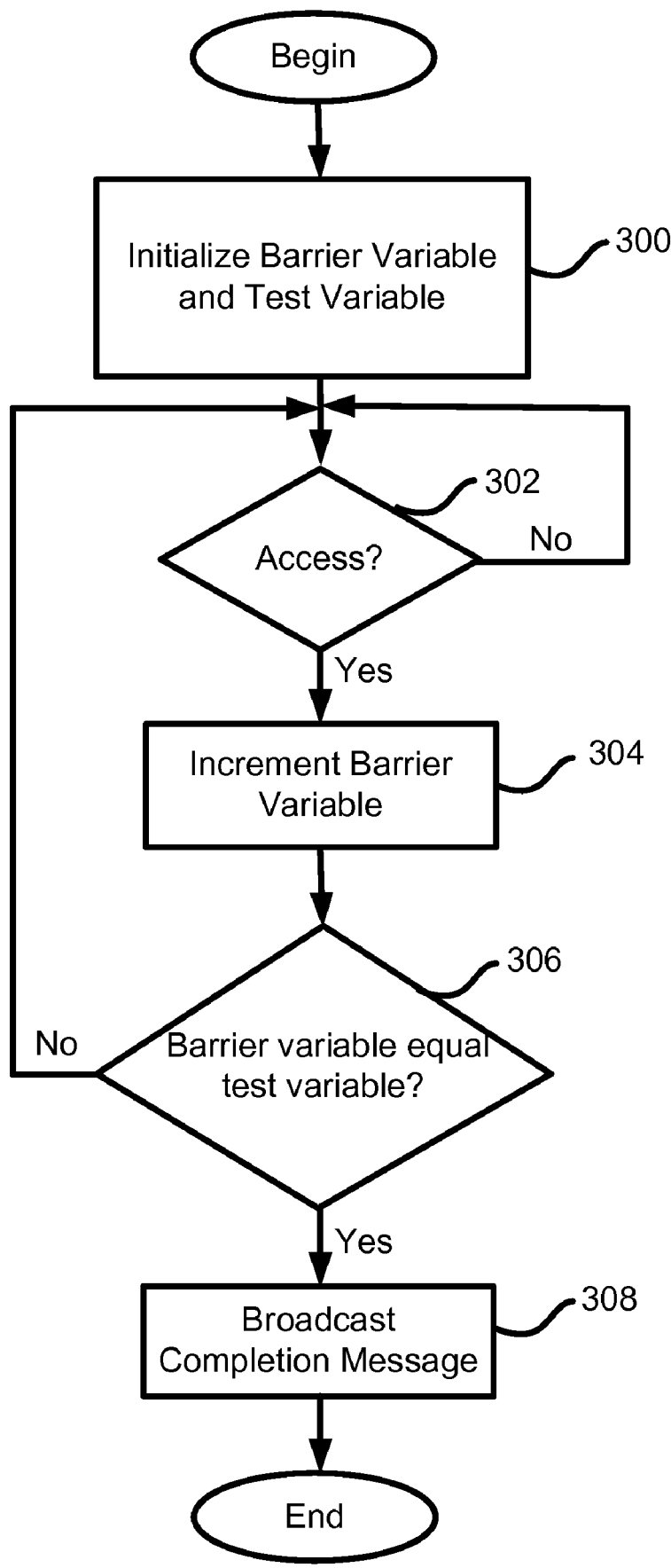
FIG. 3 shows a first process for managing memory access in accordance with illustrative embodiments of the invention.
Figure 4:
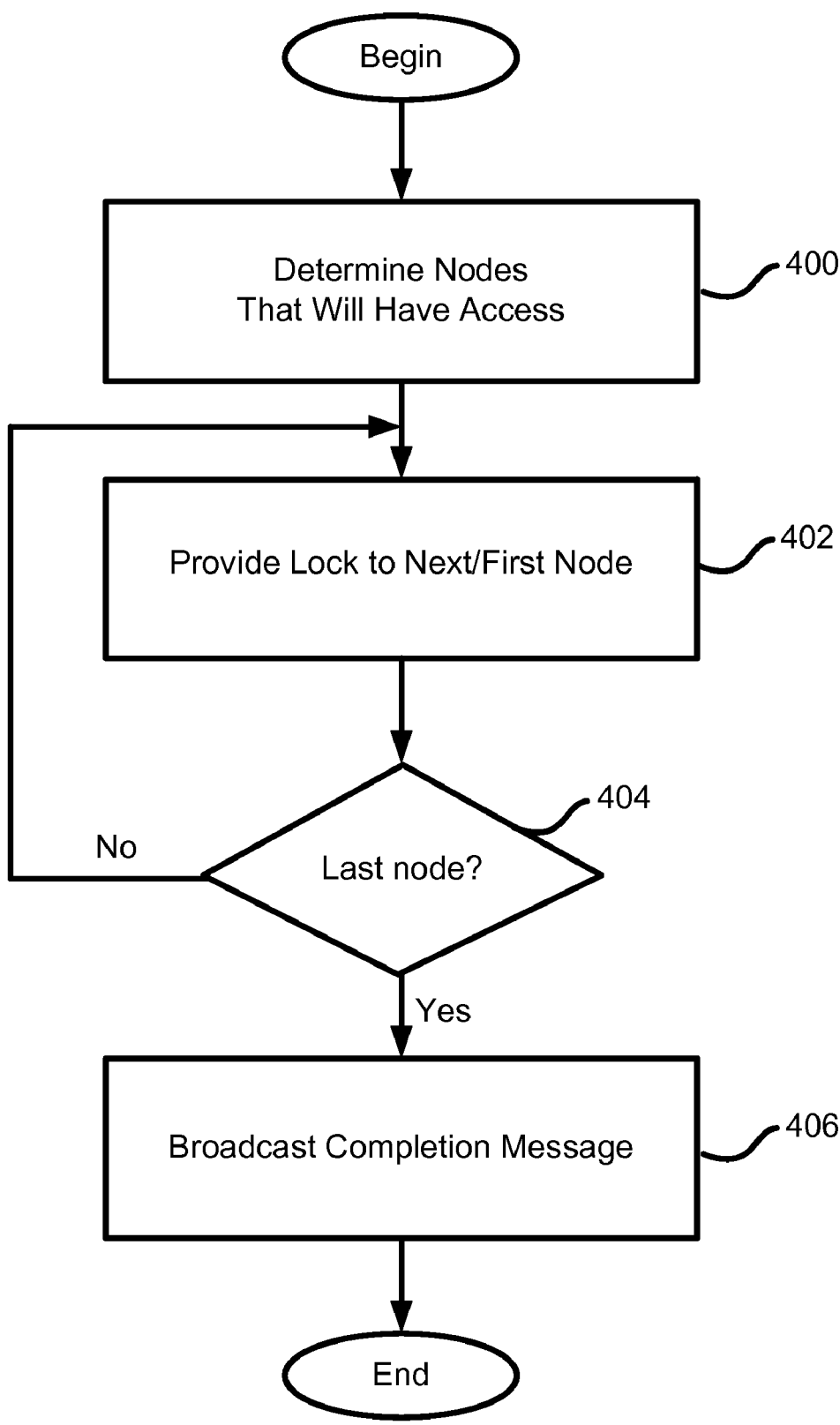
FIG. 4 shows a second process for managing memory access in accordance with illustrative embodiments of the invention.

To perform its basic barrier functions, the discussed synchronization variable module 30 has an initializing module 32 for initializing a barrier variable, a variable processor 34 for controlling the value of the barrier variable, and a comparator 36 for comparing the barrier variable to a test variable. FIGS. 3 and 4 discuss the cooperation of these and other components in greater detail.

In a manner similar to other components of the computer system 12, it should be noted that the memory controller 24 has a number of other components that are not shown in the figures. Their omission, however, should not be considered to suggest that illustrative embodiments do not use them. Moreover, other functional modules may perform similar functionality to execute various embodiments of the invention. The functional modules discussed in the figures therefore merely are intended to illustrate an embodiment of the invention and thus, not intended to limit all aspects of the invention.

FIG. 3 shows a first process for managing memory access in accordance with illustrative embodiments of the invention. Unlike the process shown in FIG. 4, this process uses well known barrier variables to control memory access. Specifically, as known by those skilled in the art, a barrier variable ensures that no node in a group of cooperating nodes 10A-10C advances beyond a specified synchronization point until all processes of a given task have reached that point. In illustrative embodiments, the barrier variable is a 32-bit word.

Before the process of FIG. 3 begins, however, some set of nodes 10A-10C are designated to concurrently execute a given process, such as multiplying a complex matrix. To that end, an application program executing on the computer system 12 may negotiate with the operating system to request specified resources, such as the total number of nodes 10A-10C or microprocessors 16 required to complete the task. For example, the application program may request that four microprocessors 16 execute a given task. The operating system responsively may designate certain microprocessors 16 on specific nodes 10A-10C to execute the task. All nodes 10A-10C maintain a record of the nodes 10/microprocessors 16 designated for various tasks. As discussed below, this data enables various steps of the process of FIG. 3.

For computer systems 12 having nodes with multiple microprocessors 16, the operating system may designate any number of microprocessors 16 on a given node 10 to a single task. In some embodiments, however, different microprocessors 16 on a single mode may be dedicated to separate tasks. The memory controllers 24 on a given home node 10A thus may service disparate requests from multiple microprocessors 16 that are on the same remote node 10B, 10C, but executing different processes.

The process of FIG. 3 begins at step 300, in which the initializing module 32 at the home node 10A initializes its barrier variable and a "test variable." For example, the process may set the barrier variable to a value of zero, and the test variable to a value equaling the total number of remote nodes 10B, 10C that require home node memory access. For simplicity, the processes of FIGS. 3 and 4 are discussed as having nodes with one microprocessor only. Of course, as noted above, principles of various embodiments apply to systems having nodes with multiple microprocessors 16 that execute separate tasks, or the same task.

In some embodiments, not all designated remote nodes 10B, 10C access the memory 18 of the home node 10A for each step of the process. For example, in one step of a given task, only remote node 10B may access home node 10A. In that case, the process sets the test variable for this step to a value of one. In a subsequent step of the same task, however, both remote nodes 10B, 10C may require access to the home node 10A. Accordingly, the test variable for that step may be set to a value of two. In those embodiments, the application program may forward data indicating the total number of remote nodes 10B, 10C requiring access during a given step. The memory controller 24 therefore sets the test variable upon receipt of this data.

At substantially the same time, all of the remote nodes 10B, 10C also initialize respective local barrier variables that are stored in their local caches. Rather than repeatedly polling the home node 10A, however, each of the remote nodes 10B, 10C repeatedly poll their local cache having their local barrier variables. Each remote node 10B and 10C therefore spins locally on its own cache. As discussed below, the local barrier variables may be updated only upon receipt of a message (from the home node 10A) requiring an update. Moreover, as also discussed below, the remote nodes 10B and 10C spin locally until they receive a barrier variable meeting a prescribed test condition.

Also at this point in the process, the home node 10A may retrieve the data (required by the remote nodes 10B, 10C) from the DRAM chips for storage in its local update cache. This transfer should facilitate access to that data, while improving system speed. Moreover, the home node 10A also may generate a record of qualities of the data in its local update cache. Among other things, the record may indicate the rights/permissions that various remote nodes 10B, 10C have to the home node cache (e.g., read only, write and read, etc . . . ), and the current state of that cache line. The home node 10A maintains and updates this record throughout the process.

The process thus continues to step 302, which determines if any remote nodes 10B, 10C are attempting to access memory 18 on the home node 10A. In illustrative embodiments, many nodes 10 may forward requests messages requesting access to the home node memory data. The control logic 26 stores each received request message in first in-first out queue (a "FIFO"), thus processing each request message in the order received. If the queue is full and it receives a request message from a given remote node 10B, 10C, the home node 10A may drop that request message and forward a retry message to the given remote node 10B, 10C. Upon receipt of the retry message, the given remote node 10B, 10C again will forward a request message to the home node 10A.

Accordingly, as noted above, the home node 10A serially services each request message from the FIFO. To that end, the home node 10A may forward a copy of the data in its local cache the remote node 10B, 10C currently being serviced. As noted above, that remote node 10B, 10C may have the rights to modify that data, and overwrite the data currently stored in the home node cache. Alternatively, that remote node 10B, 10C may have read access rights only.

After the home node 10A processes a given request message, the process continues to step 304, in which the variable processor 34 changes the barrier variable in some prescribed manner. In illustrative embodiments, the variable processor 34 increments the barrier variable by one. Of course, incrementing the barrier variable by one is but one way of modifying the barrier variable. For example, alternative embodiments may multiply the barrier variable by a given constant, or use it as a variable within some pre-specified function.

Some embodiments, however, permit other nodes to access the barrier variable. In those cases, the home node 10A may perform coherence operations prior to changing the barrier variable.

The comparator 36 then determines at step 306 if the barrier variable satisfies some prescribed relationship with the test variable. To that end, in illustrative embodiments, the comparator 36 determines if the barrier variable is equal to the test variable. Although a simple comparison is discussed, alternative embodiments may further process of the barrier and test variables to determine if they satisfy some prespecified relationship.

If the barrier variable does not equal the test variable, then the process loops back to step 302, which retrieves the next request message from the queue. Conversely, if the comparator 36 determines that barrier variable equals the test variable (at step 306), then all remote nodes 10B, 10C are deemed to have accessed the home node memory 18. In that case, the process continues to step 308, which generates and broadcasts/forwards a completion message to each of the remote nodes 10B, 10C in the computer system 12. To that end, the message generator 28 generates the completion message, and issues the broadcast message through its interface to the interconnect 22 with the other nodes 10. In some embodiments, rather than broadcasting the message, the home node 10A maintains a record of all remote nodes 10B, 10C attempting access. To reduce data traffic, such embodiments therefore forward the completion message only to those remote nodes 10B, 10C recorded as attempting to access the home node memory 18.

The completion message includes data that, when read by the remote nodes 10B, 10C, indicates that all specified remote nodes 10B, 10C have completed their access of the home node memory 18. Accordingly, among other data, the completion message may include the barrier variable incremented to its maximum specified value, and a "put" request to cause receiving remote nodes 10B, 10C to overwrite their barrier variables with the barrier variable in the message. When it receives this data, the remote node 10B, 10C therefore updates the barrier variable within its local cache. The memory controller 24 therefore is considered to push such barrier variable to the remote nodes 10B and 10C. During its next polling cycle, the remote node 10B, OC detects this maximum barrier variable, and thus is free to begin executing the next step in the process. In other words, receipt of the completion message eliminates the barrier preventing the remote node 10B, 10C from executing its next step.

This process therefore issues update messages (i.e., the completion messages) that synchronize multiple nodes 10A-10C while they each perform atomic operations on specified data. Accordingly, network hotspots are minimized because fewer barrier variable requests and broadcasts are transmitted between nodes 10A-10C.

Although barrier variables are discussed, other means may be used to implement various embodiments of the invention. For example, rather than using barrier variables, various embodiments may be implemented by using spin locks. FIG. 4 shows one such exemplary process.

As known by those skilled in the art, a spinlock ensures atomic access to data or code protected by a lock. To that end, the process begins at step 400, in which the home node 10A determines which remote nodes 10B, 10C will have access to its memory 18. This may be executed in a manner similar to step 300 of FIG. 4, in which the operating system and application program negotiate resources for a given task.

The home node 10A then forwards a lock (a data word of a specified size) to the first remote node 10B, 10C that will access its memory 18 (step 402). After the remote node 10B, 10C accesses and processes the data in a manner similar to that discussed above, the message generator 28 forwards the lock to the next remote node 10B, 10C that will access the home node memory 18. Among other ways, the message generator 28 may forward a lock message (to the remote node 10B, 10C currently having the lock) requiring that the currently accessing remote node 10B, 10C forward the lock to the next remote node 10B, 10C. Accordingly, the lock message may include the address of the next remote node 10B, 10C, as well as the lock itself. Alternatively, the home node 10A may forward the lock to the next remote node 10B, 10C, while affirmatively requiring the current remote node 10B, 10C to stop processing. In either case, the home node 10A may maintain a record of the remote node 10B, 10C having the lock. Accordingly, upon receipt of access requests from any number of remote nodes 10B, 10C, the home node 10A will only permit access by the remote node 10B, 10C recorded as having a lock.

The home node 10A then determines at step 404 if the next remote node 10B, 10C is the last remote node 10B, 10C to access its memory 18. To that end, the home node 10A may determine if a pointer to a list having the remote nodes 10B, 10C has reached a terminal variable. If the next remote node 10B, 10C is not the last remote node 10B, 10C, then the process loops back to step 402, in which the home node 10A provides the lock to the next remote node 10B, 10C.

Conversely, if the home node 10A determines at step 404 that the next remote node 10, 10C is the last node, then the process continues to step 406, in which the message generator 28 broadcasts a completion message to the remote nodes 10B, 10C in a manner similar to that discussed above. Rather than have a barrier variable, however, the broadcast message will simply have prespecified data that, when received by the remote nodes 10B, 10C, enable them to begin executing the next step of the common process.

Accordingly, in a manner similar to the process discussed with regard to FIG. 3, the process of FIG. 4 also minimizes network hotspots, thus optimizing computer system performance.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

As suggested above, the disclosed apparatus and methods (e.g., see the various flow charts described above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of controlling access by a set of accessing nodes to shared memory of a home node, the home node and accessing nodes being part of a multi-node shared-memory computer system, the method comprising:
    determining that each node in the set of nodes has accessed the shared memory; and
    forwarding a completion message to each node in the set of nodes after it is determined that each node has accessed the shared memory, the completion message having data indicating that each node in the set of nodes has accessed the shared memory of the home node.

2. The method as defined by claim 1 wherein determining comprises:
    setting a synchronization variable to an initial value;
    updating the synchronization variable each time one of the set of nodes accesses the shared memory of the home node; and
    after updating the synchronization variable, determining if the synchronization variable and a test variable satisfy a prescribed mathematical relationship.

3. The method as defined by claim 2 further comprising:
    determining that the synchronization variable satisfies the prescribed mathematical relationship with the test variable before forwarding the completion message.

4. The method as defined by claim 3 wherein the synchronization variable satisfies the prescribed mathematical relationship with the test variable when both variables have equal values.

5. The method as defined by claim 1 wherein forwarding comprises broadcasting the completion message to each accessing node in the set.

6. The method as defined by claim 1 wherein each accessing node in the set of nodes is synchronized to execute a set of steps of a common process, each accessing node not executing a subsequent step in the common process until receipt of the completion message.

7. The method as defined by claim 1 further comprising:
    detecting that each node in the set of accessing nodes is to access the shared memory of the home node.

8. The method as defined by claim 1 wherein each accessing node repeatedly accesses its local memory to determine the value of a local synchronization variable stored therein until at least after it receives the completion message.

9. The method as defined by claim 1 wherein the multi-node shared-memory computer system comprises a given number of nodes, the set of accessing nodes having fewer nodes than the given number of nodes.

10. An apparatus for controlling access by a set of accessing nodes to shared memory of a home node, the home node and accessing nodes being part of a multi-node shared-memory computer system, the apparatus comprising:

control logic operatively coupled with the shared memory of the home node, the control logic determining if each node in the set of nodes has accessed the shared memory;

a message generator for generating a completion message having data indicating that each node in the set of nodes has accessed the shared memory of the home node; and an interface operatively coupled with the message generator, the interface forwarding the completion message to each node in the set of nodes after it is determined that each node has accessed the shared memory.

11. The apparatus as defined by claim 10 wherein the control logic comprises:

an initializing module for setting a synchronization variable to an initial value;

a variable processor for updating the synchronization variable each time one of the set of nodes accesses the shared memory of the home node; and a comparator for comparing the synchronization variable to a test variable according to a prescribed mathematical relationship after updating the synchronization variable.

12. The apparatus as defined by claim 11 wherein the interface determines that the synchronization variable matches satisfies the prescribed mathematical relationship with the test variable before forwarding the completion message.

13. The apparatus as defined by claim 12 wherein the synchronization variable matches satisfies the prescribed mathematical relationship with the test variable when both variables have equal values.

14. The apparatus as defined by claim 10 wherein the interface broadcasts the completion message to each accessing node in the set.

15. The apparatus as defined by claim 10 wherein each accessing node in the set of nodes is synchronized to execute a set of steps of a common process, each accessing node not executing a subsequent step in the common process until receipt of the completion message.

16. The apparatus as defined by claim 10 wherein the control logic detects when each node in the set of accessing nodes is to access the shared memory of the home node.

17. The apparatus as defined by claim 10 wherein the multi-node shared-memory computer system comprises a given number of nodes, the set of accessing nodes having fewer nodes than the given number of nodes.

18. A computer program product for use on a computer system for controlling access by a set of accessing nodes to shared memory of a home node, the home node and accessing nodes being part of a multi-node shared-memory computer system, the computer program product comprising a computer usable device having computer readable program code thereon, the computer readable program code comprising:

program code for determining that each node in the set of nodes has accessed the shared memory; and program code for forwarding a completion message to each node in the set of nodes after it is determined that each node has accessed the shared memory, the completion message having data indicating that each node in the set of nodes has accessed the shared memory of the home node.

19. The computer program product as defined by claim 18 wherein determining comprises:

program code for setting a synchronization variable to an initial value;

program code for updating the synchronization variable each time one of the set of nodes accesses the shared memory of the home node; and program code for comparing the synchronization variable to a test variable according to a prescribed mathematical relationship after updating the synchronization variable.

20. The computer program product as defined by claim 19 further comprising:

program code for determining that the synchronization variable matches satisfies the prescribed mathematical relationship with the test variable before forwarding the completion message.

21. The computer program product as defined by claim 20 wherein the synchronization variable matches satisfies the prescribed mathematical relationship with the test variable when both variables have equal values.

22. The computer program product as defined by claim 18 wherein the program code for forwarding comprises program code for broadcasting the completion message to each accessing node in the set.

23. The computer program product as defined by claim 18 wherein each accessing node in the set of nodes is synchronized to execute a set of steps of a common process, each accessing node not executing a subsequent step in the common process until receipt of the completion message.

24. The computer program product as defined by claim 18 further comprising:

program code for detecting that each node in the set of accessing nodes is to access the shared memory of the home node.

25. The computer program product as defined by claim 18 wherein a given node in the set of nodes includes a plurality of microprocessors, no more than one of the plurality of microprocessors accessing the shared memory.

26. The computer program product as defined by claim 18 further comprising program code for distributing a spinlock to the set of accessing nodes, the spinlock controlling access by the set of accessing nodes.

27. The computer program product as defined by claim 18 wherein the multi-node shared-memory computer system comprises a given number of nodes, the set of accessing nodes having fewer nodes than the given number of nodes.

* * * * *